J. P. COPLAND.
VEHICLE WHEEL.
APPLICATION FILED MAY 17, 1916.

1,304,944.

Patented May 27, 1919.

Inventor.
James P. Copland,
By Hull, Smith, Brock West,
Atty's.

UNITED STATES PATENT OFFICE.

JAMES P. COPLAND, OF CLEVELAND, OHIO.

VEHICLE-WHEEL.

1,304,944.  Specification of Letters Patent.  Patented May 27, 1919.

Application filed May 17, 1916. Serial No. 98,015.

*To all whom it may concern:*

Be it known that I, JAMES P. COPLAND, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

This invention relates to vehicle wheels, and more particularly to wheels comprising demountable rims. One of the objects of the invention is to provide means coöperating with demountable rims whereby they may be conveniently secured to and removed from the coöperating wheel member or spider, said member being shown herein as comprising the hub and spokes, the said spider or wheel member and rim coöperating to form a wheel body. A further and more limited object of the invention is to provide a construction whereby the rim supporting and clamping means are conveniently and efficiently associated with the ends of the spokes, as distinguished from a felly or felly band which, with the hub and spokes, constitutes another type of wheel body. Further and more limited objects of the invention will appear in that part of the specification following hereinafter and will be realized in and through the combinations of elements embodied in the claims hereto annexed.

Figure 1:
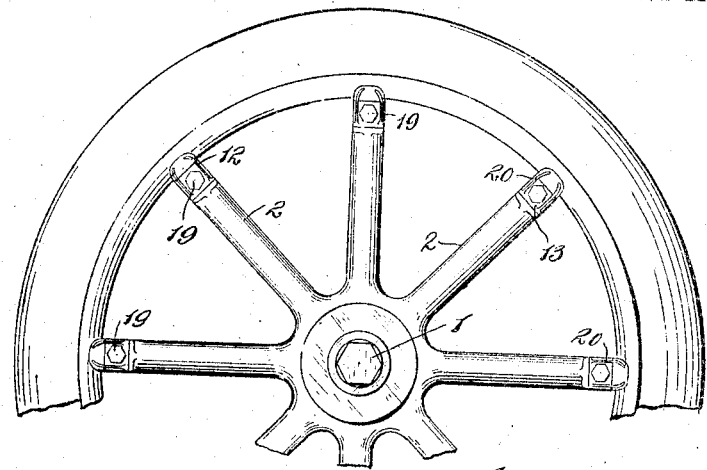
Figure 2:
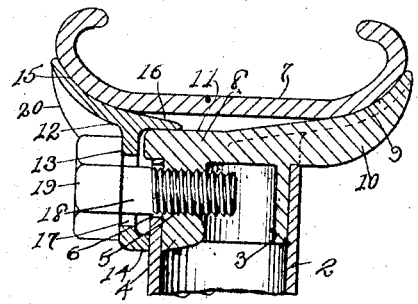
Figure 3:
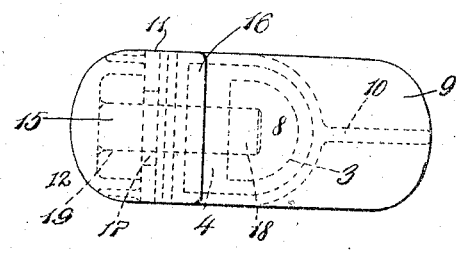
Figure 4:
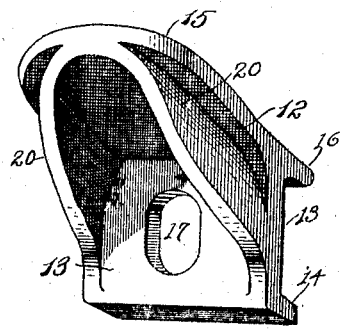
Figure 5:
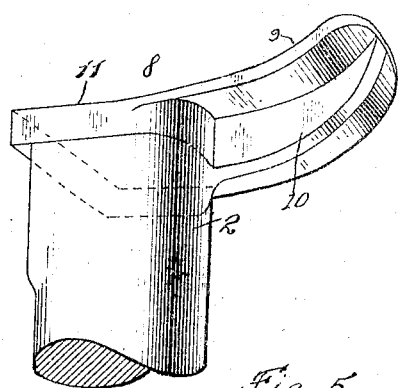

In the drawings forming part hereof, Figure 1 represents a partial front or outside elevation of a wheel embodying my invention; Fig. 2 a vertical sectional view taken through the outer end of one of the spokes and the rim; Fig. 3 a detail in plan of one of the spoke ends with the coöperating rim supporting and clamping devices; Fig. 4 a perspective view of the movable clamping device; and Fig. 5 a perspective view of the outer end of one of the spokes and its associated parts.

Describing by reference characters the various parts illustrated herein, 1 denotes the hub and 2 the spokes of a wheel body, the wheel body being shown as made of pressed metal. The outer end of the spoke has rigidly secured thereto the supporting member for the inner side of the rim. This supporting member comprises a sleeve 3 which is adapted to fit within the outer end of the spoke, the sleeve affording means whereby said supporting member may be secured to the spoke end in any convenient manner, as by brazing or electric welding. At the front or outer side, the sleeve is thickened to provide a fixed nut or anchor 4, the projection thus formed being provided with a threaded bore 5 registering with an aperture 6 in the outer or front wall of the spoke. At its outer end, the sleeve has formed therewith the supporting member for the inner side of the rim 7, which rim may be of any of the approved commercial or standard types. This supporting member, indicated generally at 8, projects laterally beyond the top of the sleeve 3 so as to bear against the end of the spoke. It extends from the outer side or face of the spoke across the end and is formed into an outwardly projecting inclined seat 9 which is adapted to receive and coöperate with the correspondingly shaped surface of the inner side of the rim 7. The member 8 may be conveniently cast with the sleeve 3 and is shown as provided with a central strengthening rib 10. At its outer or front side it is provided with a seat 11 which is preferably substantially flat and approximately parallel with the axis of the wheel.

12 denotes generally the movable clamping member which is adapted to engage the outer side of the demountable rim. This clamping member may be formed as a casting having a radially extending web 13 one end of which is provided with a flange 14 which is adapted to bear against the spoke end beneath the opening 6 and the other end of which is provided with a concaved and inclined rim-engaging surface 15 similar in shape to the seat 9 formed on the supporting member 8. The rim engaging portion is extended inwardly to provide a ledge or flange 16 which rests upon and is movable along the adjacent surface 11 of the supporting member 8. The clamping member 12 is provided with an aperture 17 through which there extends the shank of a bolt 18, said bolt being threaded into the nut or projection 4 and the shank of the bolt being of considerably less diameter than the diameter of the aperture 17 so as to enable the clamping member 12 to adjust itself with reference to the shank while being held in operative relation to the spoke and the supporting member 8 by the bolt head 19. This bolt head is shown as interposed between a pair of radially extending flanges 20 projecting from the web 13 and uniting the same with the rim engaging projection.

With the spoke ends constructed in the manner described, the operation will be more or less self-evident. The bolts 18 will be retracted sufficiently to enable the inner ends of the clamping members to clear the coöperating parts of their supporting members and to swing upon their respective bolt shanks as pivots. The rim may then be applied to the supporting members 8, whereupon the clamping members may be swung outwardly upon their bolts into rim-engaging position and their bolts set up, which will result in forcing the rim laterally against the seats at the inner sides of the spokes, the rim being carried by these seats and the corresponding coöperating seats 15 provided on the movable clamping members. The construction of the parts is such that the rim will be forced against its inner lateral seat by the lateral wedging action of the clamping members and will be maintained under tension by the radial thrust exerted upon the rim by the seat and the clamping members.

Having thus described my invention, what I claim is:—

1. The combination, with a hollow spoke end, of a rim supporting member mounted within the spoke end and having an inwardly projecting rim seat, a bolt extending through the outer wall of the spoke end and having a threaded engagement with the portion of the rim-supporting member within the spoke end, and a clamping member loosely mounted on said bolt and having a portion adapted to engage the outer side of the rim and an extension adapted to engage and move along the outer surface of the supporting member.

2. The combination with a wheel spoke and rim, of a seat member extending across and fixed directly to the end of the spoke, and having an inclined surface at one side, a wedge member fitting between the rim and the opposite side of the seat member, and a bolt connecting the wedge member and the seat member.

3. The combination, with a hollow spoke end, of a rim-supporting member having a sleeve fitting within the spoke end and a ledge adapted to engage and seat upon the spoke end, the rim-supporting member having an inclined seat adapted to receive one side of a rim and the wall of the sleeve opposite such side being thickened and provided with a threaded bore registering with an aperture in the spoke end, a bolt extending through said bore and threaded into such sleeve projection, and a movable clamping member loosely mounted on said bolt and having at one end a projection adapted to bear against and engage the spoke end opposite the thickened portion of the sleeve and having its opposite end provided with an inclined rim engaging portion and a projection adapted to ride upon the supporting member.

4. The combination, with a spoke end, of a rim supporting member mounted within the spoke end and having an inwardly projecting rim seat, a bolt having a threaded engagement with the spoke end, and a clamping member mounted on said bolt and having a portion adapted to engage the outer side of the rim and an extension adapted to engage and move along the outer surface of the supporting member.

5. The combination with a wheel spoke and demountable rim, of a seat member having a shank fitting within the outer end of the spoke and having an inclined extension at one side forming a seat for the rim, a wedge member fitting between the rim and the opposite side of the seat member, and a bolt connecting the wedge member and the shank of the seat member.

In testimony whereof, I hereunto affix my signature.

JAMES P. COPLAND.